Patented Nov. 11, 1924.

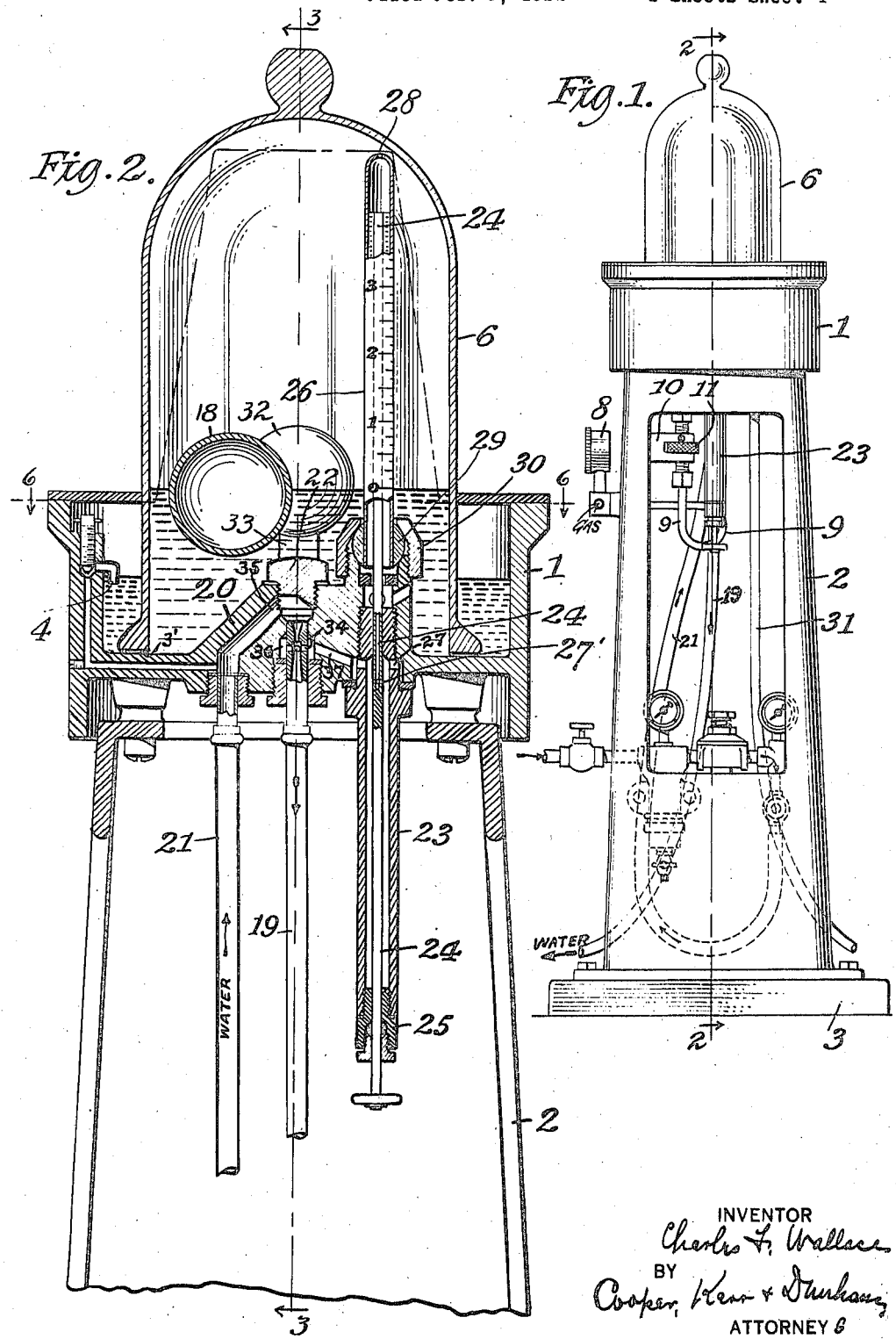

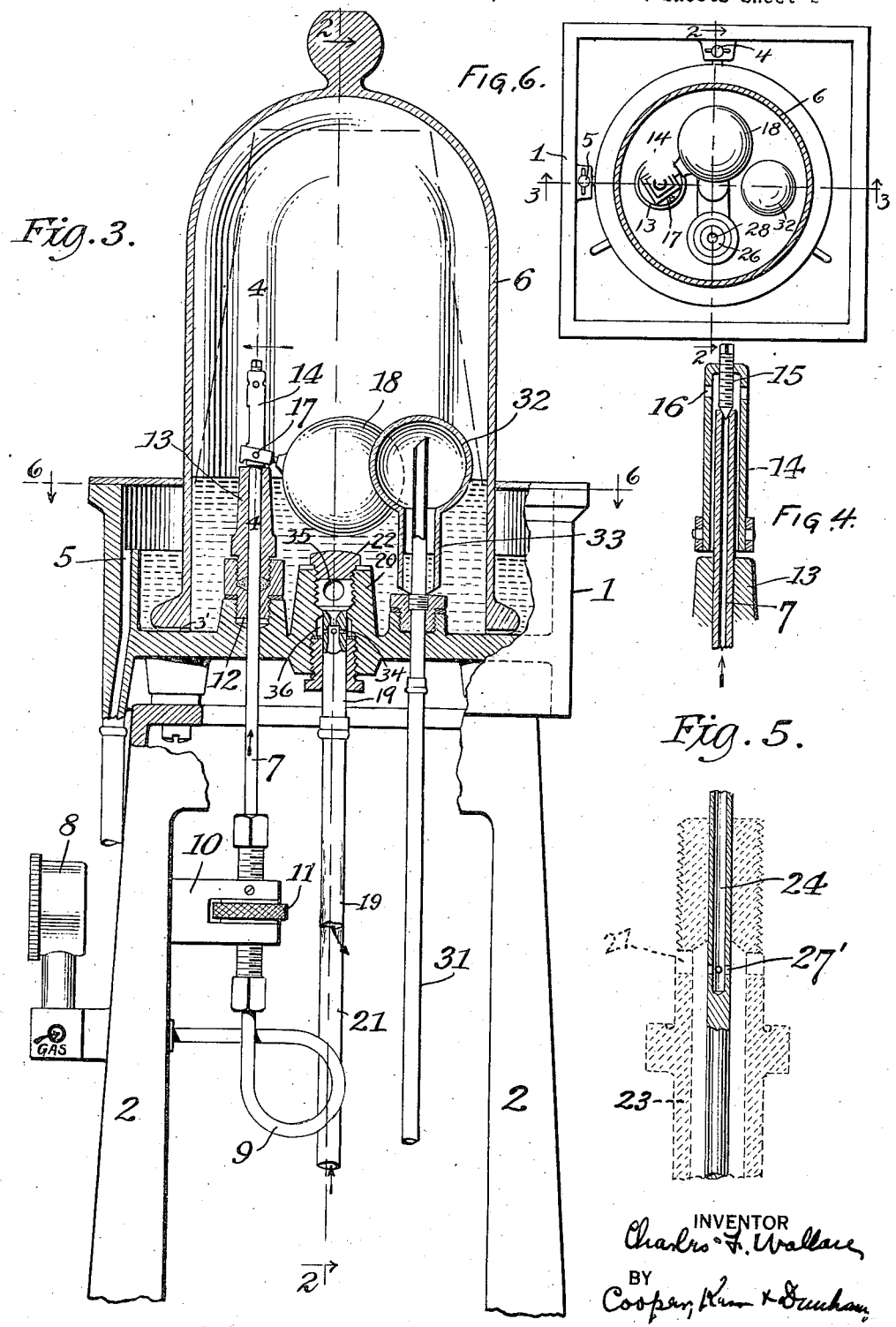

1,514,939

UNITED STATES PATENT OFFICE.

CHARLES F. WALLACE, OF WESTFIELD, NEW JERSEY, ASSIGNOR TO WALLACE & TIERNAN CO., INC., OF BELLEVILLE, NEW JERSEY, A CORPORATION OF NEW YORK.

CHLORINATOR.

Application filed February 9, 1922. Serial No. 535,179.

*To all whom it may concern:*

Be it known that I, CHARLES F. WALLACE, a citizen of the United States of America, residing at Westfield, in the county of Union and State of New Jersey (post-office address % Wallace & Tiernan Co., Inc., Newark, New Jersey), have invented certain new and useful Improvements in Chlorinators, of which the following is a full, clear, and exact description.

The invention upon which is based this application for Letters Patent of the United States is an improvement in chlorinators or apparatus for effecting the union of chlorine with other substances such as water. Such devices are now well and widely known as the means for chlorinating public water supplies and like purposes and in general comprise means for bringing together chlorine in the form of a gas and water, either that which is to be treated or a lesser quantity which is to be combined with the main body in regulable amounts.

The primary objects which I have had in view in the design of my improved apparatus are simplicity in construction, efficiency in operation and reliability under all ordinary conditions of use. It is well known that chlorine is a most formidable agent to deal with. Its highly corrosive properties, its dangerous nature, if permitted to escape, and the strict necessity of protecting from damage by water and other agents the apparatus in which it is stored under pressure and by means of which it is utilized, all demand extremely rigid precautions in order to render its use practicable and safe.

I have, therefore, devised an apparatus for this purpose in which the flow of chlorine gas from the container in which it is stored in liquid form, is automatically controlled by a novel form of float valve so that such flow may be shut off entirely upon a predetermined fall in the water level. I also provide a novel means of maintaining this water level by the negative pressure created by a water aspirator which acting through a meter tube draws off the chlorine gas and mixes and dissolves it with the water.

To prevent flooding of the chlorine connections or containers by water and to prevent the escape of the gas into the air in the vicinity of the apparatus, either of which conditions may arise as the result of improper or imperfect operation and under rise or fall in the level of the water, I have devised special safety appliances which are purely automatic in their action.

For carrying out my invention I have devised what I believe to be an entirely novel form of apparatus, which has proved in practice to be most efficient and practicable. I have shown this apparatus in the accompanying drawings in which, Fig. 1 is a view in elevation of the complete device.

Fig. 2 is a vertical central section on line 2—2 of Figs. 1, 3 and 6 of the upper and the essential novel parts of the same.

Fig. 3 is similar sectional view on line 3—3 of Figs. 2 and 6 at right angles to Fig. 2.

Fig. 4 is an enlarged vertical section of the chlorine inlet on the line 4—4 of Fig. 3, Fig. 5 is an enlarged sectional view of a portion of the meter tube shown in Fig. 2.

Fig. 6 is a cross sectional view of the upper part of the apparatus on the line 6—6 of Figs. 2 and 3.

The apparatus comprises a tray or open receptacle 1, supported by suitable and substantial columns or legs 2 on a base 3. It is designed to maintain in the tray a body of water at a fixed level for which purpose a controllable inlet valve 4, Fig. 2, is used to deliver water and the level is maintained by an outlet or overflow 5, Fig. 3. It will be understood that any well known means such as a float valve may be used to more readily and perfectly maintain the water level.

In the tray a bell jar 6 is placed and by short legs or ribs 3' on its under edge a water space under it is preserved to permit a flow of water from the outside to the inside.

Secured to one of the supporting columns or legs 2 is a bracket 10 carrying a chlorine tube 7 which is connected by a flexible or coiled portion 9 to a pressure gage 8 and to a liquid chlorine container, the latter not being shown. That portion of the tube which is connected to the bracket is threaded and engages with a milled nut 11 by which the vertical tube may be raised or lowered through a stuffing box 12 and a supporting sleeve or tube 13 set in and on the bottom of the tray. The tube 7 extends above the sleeve 13 and there is placed over it a thimble or cap 14 having a pointed screw 15 set in its top which rests in and normally closes the opening in the end of said tube 7. The cap 14 contains perforations 16 and has pivoted to it an arm 17 carrying a ball float 18.

Normally or when the float is down, the tube 7 is tightly closed but if the float be raised it lifts the cap 14 and opens said tube 7, and to effect this operation the water level inside the bell jar is maintained at such a point by means to be described that the float will open the tube, thus permitting gas to enter the jar, whereupon the level of the water falls and the tube is again closed. By this means a constant water level may be maintained inside the jar irrespective of the level of the water in the tray outside the same and a constant flow of gas is assured.

Referring now to Fig. 2: Passing up through the bottom of the tray is a pipe 19, which is secured in a suitable enlargement or prominence 20. The pipe 19 is provided at its upper end with a contracted part below which are perforations 34. Another tube 21, from a water supply under pressure, leads up through the bottom of the tray to a chamber 35 in the part 20 above the end of pipe 19, which chamber is closed by a screw plug 22. There is thus formed in connection with a passage 36 surrounding the perforated part of pipe 19, a water aspirator, to draw down the gas from the bell jar 6 and mix and dissolve it with the water flowing down the pipe 19.

The passage for this gas is formed by a channel 37 through the part 20 to perforations 27 leading into the interior of a tube 23, also secured to the part 20 in the bottom of the tray. A tube 24 passes through a stuffing box 25, up through the tube 23 and is adjustable vertically with respect thereto. The tube 24 is surmounted by a graduated glass meter tube 26 containing a small perforation 28 in its otherwise closed top and the suction produced by the water aspirator draws down the gas through this perforation from the upper part of the bell jar through the tube 24, and out through perforations 27' therein into the passage to the water aspirator.

This suction produces a partial vacuum in the bell jar and raises the level of the water therein above that in the tray outside. The rate of flow of the gas is determined by the difference in pressure in the meter tube 26 and the bell jar 6. The tube 24 is made adjustable vertically to determine this. The lower end of the tube 26 is open and below the level of the water in the jar, hence the suction of the aspirator will suffice to raise the level of the water in the said tube up to the level of the top of the tube 24, this being caused by the capacity of the aspirator being greater than that of the orifice 28 in the top of the tube 26.

The pressure acting to draw off the gas will therefore be indicated by the level of the water in tube 26, the maximum pressure depending upon the vertical adjustment of the tube 24, for the water can reach no higher level than the open top of the tube, and increased action of the ejector will draw water through the tube. The graduations on the tube 26, with the water level in the tube, by reason of orifice 28, will thus serve to indicate the rate at which gas is drawn off from the bell jar and dissolved in the water.

To facilitate perfect alignment of the two tubes 24 and 26, the latter carries at its lower end a spherical part 29 over which a suitably shaped cap 30 may be screwed down onto a threaded nipple on the part 20. If the tube 24 does not occupy a strictly vertical position or if it becomes slightly bent, the tube 26 may be adjusted by the means described to maintain the concentricity of the two tubes.

Should it happen for any reason that the water level under the bell jar should rise it might find its way down the gas inlet 16 into the chlorine tube 7 and this it is most necessary to avoid. For this purpose I use a safety device which operates to prevent such an occurrence. This consists of a tube 31 passing up through the bottom of the tray into the bell jar. The open end of this tube is covered by a hollow ball 32 which floats upon the water in the bell jar and which has a stem 33 that fits over the tube. As the interior of this bell is at atmospheric pressure the water level in the stem will be that in the tray outside the bell jar. Should the water level in the jar rise, the ball float 32 rises until its lower end passes the lower water level whereupon the outside air will rush into the bell jar and immediately maintain the level of the water therein.

Thus if the flow of gas should cease no injury to the apparatus would result from the tendency of the water to rise under the bell jar, as the suction of the water aspirator would be more than compensated for by the inrush of air to the bell jar.

On the other hand, it might happen that an abnormal flow of gas into the bell jar, due to a pressure higher than normal or an occumulation of gas therein due to some obstruction in the outflow would tend to force down the water level under said jar, with the result that the gas might escape by bubbling out under the edge of the jar and into the room where the device is placed. The dangerous character of the gas would make this most objectionable, and its escape in this way would be prevented by the ball float 32, for as soon as the level of the water reaches the lower end of the stem 33, the interior of the jar is opened to the air through the tube 31, and the gas would pass off in this way to a point where it can do no damage.

The above-described apparatus is one which is self-contained, purely automatic and constructed and designed to meet all possible contingencies which may arise in carrying out the process for which it is intended. It possesses many and important advantages among the most obvious of which is the fact that from its character and construction it secures a distinctly visible feed, the rate of which may be seen at a glance. It furnishes a supply of chlorine gas at a negative head or pressure below atmospheric, which results in the total absence of the danger of flooding of the inlet piping 1 or of gas leaks. All parts are readily and immediately accessible, and are or may be corrosion proof. The number of chlorin valves is reduced to a minimum, while the rate of flow of the gas or "dose" as it is termed, is varied not by any valve operation but by the variation of the pressure head on the orifice or chlorin outlet. In many respects the devices employed may be of widely different nature from that described, provided they be capable of the same or substantially the same functions. The specific character of the parts, in other words, while new in the particulars hereinafter pointed out in the claims is not of the essence of my invention.

What I claim is:—

1. In a chlorinator, the combination with a tray or open receptacle in which is maintained a body of water at constant level, of a bell jar therein, a pipe conveying chlorin into the same, a suction pipe withdrawing the gas therefrom, and means for controlling the supply of said chlorin to the bell jar dependent upon the level of the water therein.

2. In a chlorinator, the combination with a tray or open receptacle in which is maintained a body of water at constant level, of a bell jar therein, a pipe conveying chlorin into the same, a suction pipe for withdrawing the gas therefrom, means for controlling the supply of chlorin to the jar dependent upon the level of the water therein, and means for controlling the rate of flow of the gas withdrawn, and the level of the water under the bell jar.

3. In a chlorinator, the combination with a tray or open receptacle for containing water at a constant level, of a bell jar set therein, a chlorin inlet opening into said jar, a float valve controlling the same, a chlorin outlet, a water aspirator which creates a suction through the same, and means for varying the pressure head on such outlet to vary the rate of flow of the gas withdrawn through the same.

4. In a chlorinator, the combination with a tray or open receptacle for containing water at a constant level, of a bell jar set therein, a chlorin inlet opening into said jar, means dependent upon the water level under said jar for controlling said inlet, a suction pipe for withdrawing the gas from the jar, a hollow member under the jar adapted to open communication to the atmosphere when the water under the jar rises above or falls below a given level.

5. In a chlorinator, the combination with a tray or open receptacle for containing water at a constant level, of a bell jar set therein, a valve controlled chlorin inlet opening into the said jar, a suction pipe for withdrawing the gas from the jar, and a hollow member which permits communication between the jar and a safety vent pipe for gas, when the water under the jar is forced down to a given point by the accumulation of gas in said jar or is raised to a given point by the withdrawal of gas in said jar.

6. In a chlorinator, the combination with a tray, of means for maintaining a constant level of water therein, a chlorin inlet pipe, and a chlorin outlet pipe, both passing up through the bottom of said tray, a water aspirator connecting with the outlet pipe, a bell jar set in the tray over the inlet and outlet pipes, and means for controlling the flow of chlorin through both of said pipes.

7. In a chlorinator, the combination with a tray for containing water at a constant level, of a bell jar set therein, a chlorin inlet pipe opening into said jar, a meter tube open at the bottom which is below the water level in the jar and having a contracted orifice at the top, a tube extending up through the bottom of the tray and into said tube, and a water aspirator, the gas supply passage in which communicates with the meter tube.

8. In a chlorinator, the combination with a tray for containing water at a constant level, of a bell jar set therein, a chlorin inlet pipe opening into the said jar, a graduated tube open at the bottom, which is below the level of the water in the jar, and having a contracted orifice at the top, a gas tube extending up through the bottom of the tray and into the said graduated tube and longitudinally adjustable with respect thereto, and a water aspirator the gas passage of which communicates with the gas tube.

9. In a chlorinator such as herein described, a tray or open receptacle, a bell jar set therein, a gas tube extending up through the tray, a meter tube surrounding said gas tube and a universal joint between the said meter tube and the tray whereby the concentricity of said tube and the gas tube may be maintained.

10. A chlorinator comprising in combination, a liquid sealed chamber, means for maintaining the pressure in said chamber constant and lower than that of the atmosphere, means for introducing gas into said chamber, means for withdrawing the gas therefrom, and for mixing said gas with another medium such as water.

11. A chlorinator comprising in combination, a water sealed chamber, means for maintaining the pressure therein constant and below that of the atmosphere, a valve controlled passage for chlorine opening into said chamber, an outlet passage through which said gas is withdrawn from the chamber, and means for mixing the withdrawn gas with water and withdrawing it from the chamber.

In testimony whereof I hereto affix my signature.

CHARLES F. WALLACE.